(No Model.)
M. D. BEACH.
FEED TROUGH FOR POULTRY.
No. 347,081. Patented Aug. 10, 1886.
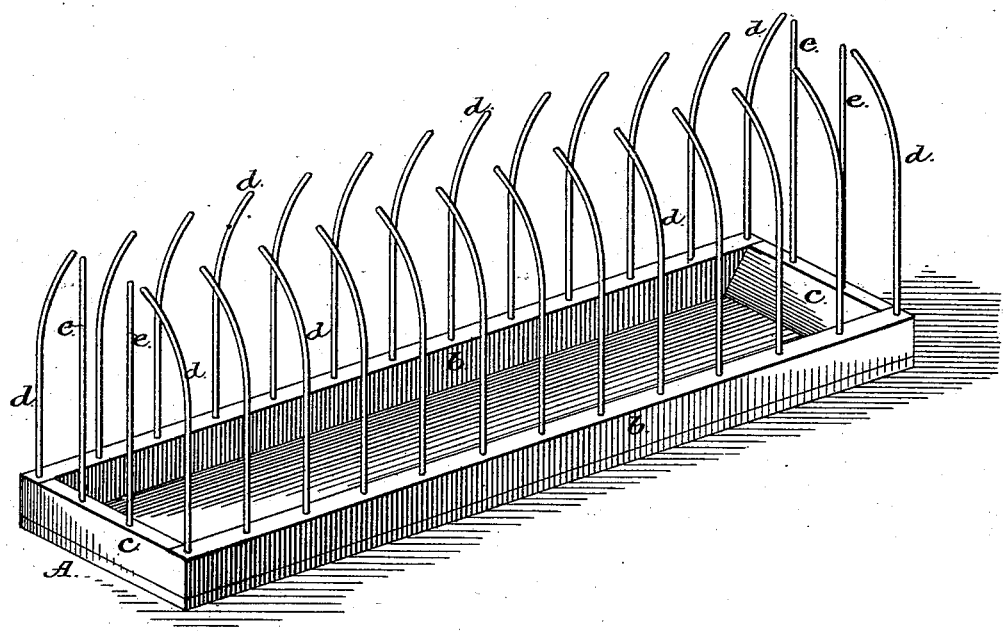
WITNESSES:
John A. Ellis.
C. Sedgwick
INVENTOR:
M. D. Beach
BY Munn & Co
ATTORNEYS.

UNITED STATES PATENT OFFICE.

MILO DAVID BEACH, OF LITCHFIELD, CONNECTICUT.

FEED-TROUGH FOR POULTRY.

SPECIFICATION forming part of Letters Patent No. 347,081, dated August 10, 1886.

Application filed May 12, 1886. Serial No. 201,963. (No model.)

*To all whom it may concern:*

Be it known that I, MILO DAVID BEACH, of Litchfield, county of Litchfield and State of Connecticut, have invented new and useful Improvements in Feed-Troughs for Poultry, of which the following is a specification, reference being had to the annexed drawing, which is a perspective view.

The object of my invention is to provide a feed-trough for poultry, which will contain food and water accessible to the fowls, but so arranged as to prevent the fowls from lighting on the top of the trough.

My invention consists in the construction and arrangement of parts, as will be hereinafter fully described and claimed.

In the present case, I have made the trough of oblong rectangular shape; but I do not limit or confine my improvement to this particular form.

The trough A is formed of the bottom board, *a*, the side pieces, *b*, and end pieces, *c*, secured to the top of the bottom board at the sides and ends thereof. In the upper edges of the side pieces are inserted upright wires *d*, whose ends are curved over toward the center of the trough, and are separated by spaces which are insufficient to admit the body of a fowl. In the end pieces, *c*, are inserted upright wires *e*. As the upper ends of the wires *d e* are unprotected, the fowls cannot light on the top of the trough.

It is obvious that I may employ slats or curved wooden rods in place of the wires; but I prefer the wires, as they occupy less room and are less favorable to the lighting of the fowls on the top of the trough.

The space between the upper ends of the wires permits of readily introducing food and water to the trough, and allows of the introduction of a broom flatwise for the purpose of cleaning the trough.

Having thus described my invention, what I claim as new, and desire to secure by Letters Patent, is—

A feed-trough for poultry provided with a series of upward-projecting spaced wires, the wires at the sides being curved inward toward each other at their upper ends, but not in any way connected at said upper ends, substantially as set forth.

MILO DAVID BEACH.

Witnesses:
JOHN T. HUBBARD,
GEO. M. WOODRUFF.